July 7, 1959 H. M. PASSMAN 2,893,704
COOLING SYSTEM
Filed May 20, 1957
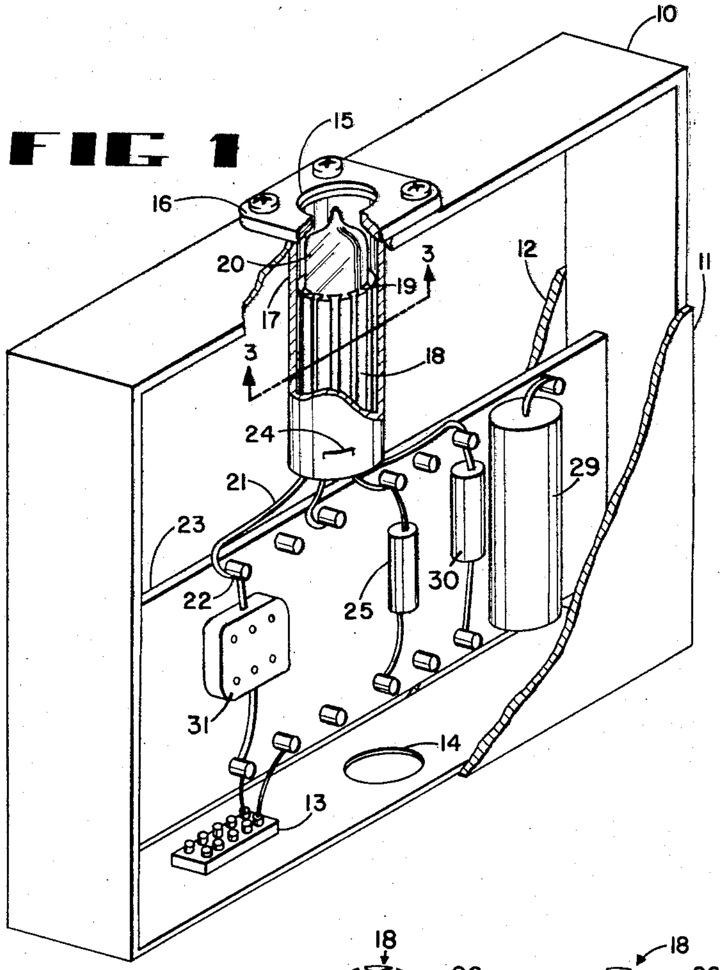
FIG 1
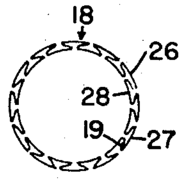
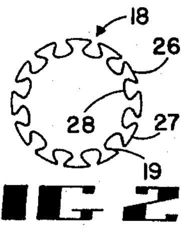
FIG 3 FIG 2
INVENTOR.
HARRY M. PASSMAN
BY
Mody & Holecka
ATTORNEYS

United States Patent Office 2,893,704

Patented July 7, 1959

2,893,704

COOLING SYSTEM

Harry M. Passman, Cedar Rapids, Iowa, assignor to Collins Radio Company, Cedar Rapids, Iowa, a corporation of Iowa Application May 20, 1957, Serial No. 660,136

4 Claims. (Cl. 257—250)

This invention relates to packaging of electronic circuit components and more particularly to the mounting and cooling of components and thermionic tubes.

Prior art methods of packaging a series of thermionic vacuum tubes of the type known as subminiature and the associated circuitry have not been particularly satisfactory. In many instances the circuit has been limited by the cooling which can be effectuated for the vacuum tubes. This is particularly so when packaging circuit components in as small a space as possible. Further, the circuit components themselves show critical frailty at high temperatures endangering satisfactory reliability. A further objection to prior art packaging arises when circuits are sectionalized so as to be replaceable as integral units. In prior systems the modular packaging did not admit of satisfactory cooling of either circuit components or tubes connected therewith. A further difficulty in the prior art packaging arises particularly from heat difficulties in that the subminiature tubes used were not mounted satisfactorily either for shock resistance or alternatively for cooling. Also, in systems where the cooling is satisfactory, although expensive in terms of air flow, the equipment is so dependent on cooling air flow that failure of this vital factor leads to circuit failure within a minute. The particular subminiature tube to be mounted is typically one which has a cylindrical envelope and lead wires extending from one end for soldering into the circuit.

It is, accordingly, an object of this invention to provide a packaging system for electronic circuits and thermionic tubes which mounts and cools all components in a satisfactory manner.

It is an object of this invention to provide a cooling tube mounting having extremely high thermal efficiency and shock isolation capabilities as well as easy mechanical integration with the remainder of the package.

It is a further object of this invention to provide a mounting arrangement for electronic components which cools the components efficiently, permitting compact modular packaging.

It is yet a further object to provide a structure having fail-safe thermal characteristics, holding up under operation for at least ten minutes after the cooling air supply fails.

It is a feature of this invention that the components are cooled substantially in the ascending order of their temperatures providing the maximum temperature gradient and, therefore, cooling for each element.

It is a further feature of this invention that the tubes mounted form the final exit channels for the cooling medium, the tubes being held in place by an elastic liner providing grossly improved cooling of the tubes.

Further objects, features, and advantages of the invention will become apparent from the following description and claims when read in conjunction with the accompanying drawing in which:

Figure 1 shows an isometric view in partial section showing a module utilizing the invention, Figure 2 shows a section view of the tube mounting liner in the absence of the tube, while Figure 3 shows a section of the liner only in the form it takes with the tube in place.

In Figure 1 a frame 10 establishes the general size of a module. This frame has side plates 11 and 12 enclosing the frame making it substantially fluid-tight. In this instance, "fluid" is used as a generic term encompassing any of the cooling mediums used in heat exchange systems. In the normal instance, the fluid used for cooling is air, although under certain pressure conditions dry nitrogen might be used.

The relatively fluid-tight enclosure has along one side of the frame 10 an electrical plug 13 and a cooling fluid inlet 14. The plug and inlet are positioned so as to match with a cooperating frame carrying the complementary socket and a manifold, not illustrated, which supply the electrical circuits and cooling fluid for this module. Mounting means such as screws, clips, or other means of fastening the module to the frame as are used, are not shown to avoid complication of illustration.

The passage of the cooling fluid is controlled by an orifice type of exit opening 15. This orifice is formed by the flange end 16 of a mounting shell 17. This mounting shell is mounted by its flange by passing in from without through a hole in frame 10. This mounting shell is cylindrical and has an internal bore somewhat larger than the tube being mounted. The inner end of the shell carries one or more lances 24 for purposes which will be described below. The size of the orifice 15 is adjusted relative to the velocity of air desired, and the available pressure at inlet 14 so as to maintain the cooling rate needed.

Prior to this invention, the subminiature vacuum tube was usually mounted in a fuse holder type of clip providing reasonably good mechanical mounting but very poor thermal efficiency. In the development of the invention, the tube was then mounted within a hollow shell such as the mounting shell 17 with air blown past the tube. Even this arrangement did not cool the tube satisfactorily for high ambient temperatures. The surface of the tube envelope became hot enough to give trouble from spurious conduction, electrolysis, etc.

A liner was then devised to provide a combined conduction, convection, and radiation loss of heat from the tube. This liner 18 contacts the tube over a portion of its surface and conducts away heat into the chordal links 19 where greater surface for radiation of heat to the passing fluid stream is available. Areas of the tube remain uncovered for direct convection heat loss due to the passage of the air stream, and for direct radiation of heat. Primarily, however, in view of the failures of previous mountings of the tubes, the presence of the liner increases the heat loss of the tube by conduction effects, adding considerable area for heat loss. The liner in this case apparently acts as an additional radiating surface.

The vacuum tube 20 is mounted by slipping it within the central area of the liner 18. The contact made is elastic and, in view of the pressure of the liner, has sufficiently high friction to prevent the tube from slipping along its axis under shock or vibration. The liner is prevented from slipping along the shell by virtue of the orifice 15 being smaller than the internal bore of the shell 17 on the upper end and by the lances 24 by the open end of the shell.

The vacuum tube 20 has a plurality of leads 21 which are connected by soldering or other means to posts 22 mounted on an insulating terminal board 23. The terminal board 23 is mounted within the volume of the frame 10 so as to be convenient to the vacuum tubes mounted at one edge and to the connecting plug 13 mounted at the opposite edge. Components 29, 30, and 31 are mounted on the terminal board 23 between terminals such as 22. Only a few components are shown to avoid complexity of the illustration. The number of components, plug circuits, and tubes, of course, is determined by the particular circuitry which is packaged in the module.

In the circuit shown, a circuit component such as a load resistor 25 is mounted so as to be more directly in the fluid stream. The lower temperature components and those which must be kept coolest are mounted nearest the cooling fluid inlet, while the hotter elements follow, along the stream. The vacuum tube, generally the hottest element, thus is last in the stream. Since the cooling of an element depends on the difference in temperature between the cooling fluid and the element, each element then has the best cooling relative to the entirety by its arrangement in ascending order of temperature along the cooling fluid stream.

In prior cooling arrangements, before the cooling liner was utilized to combine thermal efficiency and optimum shock mounting, excessively high cooling flow, in the order of 10 to 15 cubic feet per minute was needed to keep the tube temperature at even a dangerously high level. Use of the liner and the cooling arrangement described reduces this requirement of cooling fluid to approximately two cubic feet per minute resulting in a substantial saving in the blower system required. Now, too, the temperatures of the various circuit components also are maintained in a safe operating range. Also, the effect of the liner, shell, and frame in good thermally conductive contact is to provide a heat sink on event of cooling air failure. Note that these parts, as well as the tube are at a low temperature as long as air is circulated; the tube because of the air, the rest because the primary source of heat is cooled directly before the rest are warmed up. Thus, a large thermal mass is present which absorbs a lot of heat, giving typical models of the invention ten minutes of operation before failure. These ten minutes are very important in some applications, such as in jet aircraft when the craft air conditioning fails.

Previously, temperatures of items such as the load resistor 25 would range up to 75° C. The resistors now are held to approximately 40° C. with a cooling air temperature of 35° C.

Figure 2 shows a section of the liner 18, somewhat enlarged, to show the construction thereof. In Figure 2 the tube has been removed such that the liner has expanded into its relaxed cylindrical shape. The usual starting form of a liner is as a strip of metal, pleated. It is then rolled up with the ends matching approximately at 26. The liner is composed of a series of arcs 27 and 28 alternating concave in and concave out, coupled by flat panels as chordal links 19. The geometry of the concave inward links 27 is substantially that of the inside bore of the mounting shell 17.

Figure 3 shows the cross section of the cooling liner in the position which it assumes upon insertion of the vacuum tube being held. The internal inverted arc sections which were concave outwardly have collapsed and assume substantially the radius of the tube. The extra length coming from the flattening of the inverted arcs is just enough to compensate for the change in length between the ends of the chordal links due to their change in direction. Thus, the chlordal links merely pivot, so that there is no deforming stress on them. The chordal links merely pivot out yielding to the compression caused by the insertion of the vacuum tube, giving a highly elastic support to the tube which is capable of absorbing considerable shock. The internal inverted arcs make a good surface contact with the tube for conduction of heat generated by the tube into the chordal links where the cooling stream absorbs the heat transferred there. Upon withdrawal of the tube from the mounting, the cooling liner recovers its original shape as seen in Figure 2, as a consequence of its elasticity.

Although this invention has been described with respect to particular embodiments thereof, it is not to be so limited because changes and modifications may be made therein which are within the full intended scope of the invention as defined by the appended claims.

I claim:

1. A cooling system comprising an enclosure, said enclosure having a cooling fluid inlet and containing a plurality of heat sources including a cylindrical thermionic device, a mounting shell which is a hollow cylinder mounted on a wall of said enclosure, an opening formed in said enclosure in alignment with the shell and forming a fluid outlet, a cooling liner mounted within said shell, and the thermionic device mounted within said liner so that heat may be removed therefrom.

2. The cooling system of claim 1 wherein said cooling fluid flows through the shell and out through said opening and said opening having a predetermined size to regulate the flow of cooling fluid.

3. A cooling system for thermionic devices comprising an enclosure, said enclosure having a cooling fluid inlet and outlet comprising openings in said enclosure walls, said enclosure being otherwise substantially fluid-tight, a hollow mounting shell of heat conducting material attached to said enclosure about the outlet opening, a longitudinally pleated cooling means mounted in said shell, a thermionic device mounted within said cooling means whereby cooling fluid exits from the enclosure past said cooling liner and said thermionic means through the fluid outlet.

4. A cooling system comprising a substantially fluid-tight enclosure, a cooling fluid inlet on one wall of said enclosure, a plurality of heat sources mounted within said enclosure, an opening formed in the wall of said enclosure and forming an outlet for said cooling fluid, a hollow cylinder attached to the enclosure in alignment with the opening and forming the terminal portion of a path for said cooling fluid over said heat sources, a liner comprising a pleated strip of metal rolled into a cylinder mounted in said cylinder, said pleats running lengthwise of said cylinder, and a cylindrical thermionic device mounted within said liner.

References Cited in the file of this patent

UNITED STATES PATENTS

| | | |
|---|---|---|
| 1,537,228 | Gargan | May 12, 1925 |
| 2,386,733 | Wolf | Oct. 9, 1945 |
| 2,745,895 | Lideen | May 15, 1956 |